United States Patent [19]

Goldowsky et al.

[11] Patent Number: 5,066,512

[45] Date of Patent: Nov. 19, 1991

[54] ELECTROSTATIC DEPOSITION OF LCD COLOR FILTERS

[75] Inventors: Michael P. Goldowsky, Valhalla; William B. Pennebaker, Carmel, both of N.Y.

[73] Assignee: International Business Machines Corporation, Yorktown Heights, N.Y.

[21] Appl. No.: 448,174

[22] Filed: Dec. 8, 1989

[51] Int. Cl.⁵ .................. B05D 5/06; B05D 1/04; D06P 5/00; D06P 5/20
[52] U.S. Cl. .................... 427/14.1; 427/110; 8/444; 8/478; 8/485
[58] Field of Search .......... 427/14.1, 68, 75, 110; 8/444, 478, 485

[56] References Cited

U.S. PATENT DOCUMENTS

| | | | |
|---|---|---|---|
| 4,345,907 | 8/1982 | Wegele et al. | 8/444 |
| 4,381,342 | 4/1983 | Van Heyningen | 403/496 |
| 4,427,712 | 1/1984 | Pan | 427/13 |
| 4,440,800 | 4/1984 | Morton et al. | 427/13 |
| 4,743,098 | 5/1988 | Dickerson et al. | 350/339 |

FOREIGN PATENT DOCUMENTS

| | | | |
|---|---|---|---|
| 246235 | 5/1984 | Japan . | |
| 254001 | 12/1985 | Japan . | |
| 655032 | 7/1951 | United Kingdom | 427/14.1 |

OTHER PUBLICATIONS

"Aerosol Jet Printing", by W. B. Pennebaker, Proceeding of the SID, vol. 17/4, Fourth Quarter 1976, pp. 160-168.

IBM Technical Disclosure Bulletin, vol. 15, No. 9, Feb. 1973, pp. 2726-2727.

A Full Color Matrix Liquid-Crystal Display with Color Layers on the Electrodes, by Uchida et al., IEEE Transactions on Electron Devices, vol. ED-30, No. 5, May 1983, pp. 503-507.

Fabrication of Color Filter Arrays for Solid State Imagers by Laser Induced Dye Diffusion Into Polymers, by Loutfy et al., Jrnl of Imaging Science, vol. 29, No. 5, Sep./Oct. 1985, pp. 161-164.

Multicolor Graphic LCD with Tricolor Layers Formed by Electrodeposition, by Kamamori et al., Sid 84 Digest, pp. 215-217.

A New Class of Color Filters for Liquid Crystal Displays, by Latham et al., SID 87 Digest, pp. 379-382.

*Primary Examiner*—Evan Lawrence
*Attorney, Agent, or Firm*—Perman & Green

[57] ABSTRACT

Methods for the coating of different closely-spaced areas of an electrode member to produce a color filter matrix thereon. A thin translucent layer of electroconductive composition, such as indium tin oxide (ITO), is applied to isolated areas of the electrode substrate, and selected ones of said areas are charged to one polarity while the other closely-spaced areas are charged to an opposite polarity. Color material is introduced as fine droplets in a volatile vehicle, charged to said opposite polarity, for selective attraction to said selected areas and repulsion from all other areas. The procedure is repeated with different color material droplets for deposition on others of said closely-spaced areas to produce a multi-colored matrix filter, such as on the lower pel electrode or on the upper pixel common electrode of a LCD device. Preferably the ITO layer is coated with a thin polymer layer and the color material is a diffusible dye which is heat-diffused thereinto.

16 Claims, 2 Drawing Sheets

ELECTROSTATIC DEPOSITION OF LCD COLOR FILTERS

FIELD OF THE INVENTION

The present invention relates to improved methods and an apparatus for forming color filters for thin film transistor liquid crystal display devices having color capabilities. More particularly, the invention relates to improved methods for selectively depositing different colored applications on individual color filter regions to produce a multi-color filter layer, such as for a liquid crystal display device.

DESCRIPTION OF THE PRIOR ART

Liquid crystal display devices are in widespread use for providing intelligible messages for a variety of purposes, primarily numerical messages as in LCD watches, calculators and related devices. Reference is made to Dickerson et al. U.S. Pat. No. 4,743,098 for its general disclosure of the technical operation of thin film transistor (TFT) liquid crystal display (LCD) devices, and most particularly the alteration of the light transmissivity of the liquid crystal material in the area between the transparent common electrode and the energized individual picture element electrodes (pels or pixels), and the function of the color filter layer in providing different colors to background light or to reflected light passing through the light transmissive areas of the liquid crystal layer. The pels and filter regions are assembled in triads or patterns of different colors, i.e., red, blue and green, so that when energized singly, in pairs or in triad, a single color, a two-paired color or a three-paired opaque or black background color is imparted to the light transmitted by the portions of the liquid crystal material present intermediate the energized electrodes.

U.S. Pat. No. 4,743,098 discloses the prior use of a variety of different multi-color filter layers for LCD devices having color capabilities. These include the use of light-sensitized adhesive layers color-patterned in three separate color-application steps. Such a process is expensive and presents quality control problems with respect to perfect registration and separation of the desired colors. Another known approach is to use photolithographic lift-off color patterning, which also presents the aforementioned problems. Also, dyed and patterned films have been proposed as internal color polarizing filters.

Yet another proposed method for achieving the desired result of LCD devices having multi-color capability involves the deposit of sublimable dyes and inks onto coated glass substrates at individual pel locations such as by means of resistive transfer ribbons or thermal transfer heads. These methods cause the colored deposit to spread or dissipate out of the heated zones, which makes it difficult to deposit the individual colors in the very small pel areas, generally 2 mils to 4 mils square, as discrete uniform layer applications isolated from and uncontaminated by adjacent applications of different colors. These and other disadvantages make such methods unsatisfactory.

It is known according to U.S. Pat. 4,381,342 (Van Heyningen) to deposit different photographic materials in a predetermined pattern into cells present on a photographic support by electrostatically-charging liquid coating droplets and forming an electrostatic charge pattern on the cell walls of the photographic support to repel the droplets into the cells on the support. Such a method is expensive in that it requires photographic preparation of the support, to provide the cells thereon, and is impractical for use in preparing LCD filters having discrete pel areas since the deposit of different compositions into different cells requires synchronizing the support movement, the rate of drop generation and particular drop deflectors in order to aim and deposit different compositions into different predetermined cells on the support. Any variation in any of these requirements results in more than one composition being deflected into different cells and/or the deposit of different, non-uniform volumes of compositions in the different cells.

It is also known to apply dyestuffs and other materials to a web by electrostatic deposition whereby fine droplets of composition are sprayed between a high-voltage grid electrode and a grounded web to charge the droplets and cause them to be attracted to the web. Reference is made to U.S. Pat. No. 4,345,907 (Wegele). Such methods require the use of high voltage and result in a uniform coating of the entire web surface.

It is known to electrodeposit discrete colored layers of a liquid dye solution sequentially onto different areas of a patterned transparent electrode member to form a multicolor LCD member, as disclosed in the article titled "Multicolor Graphic LCD with Tricolor Layers Formed by Electrodeposition" by Kamamori et al., SID 84 Digest, pages 215-218. This method is similar to the electroplating of metals in that a voltage is placed upon the intended pel areas, in sequence, and through the different solutions, in sequence, to disassociate the dye molecules and cause them to deposit, in sequence, on said different pel areas. Such a method is low in cost and can deposit uniform dye layers. However even minor contamination of the transparent electrode filter member easily causes shorts between adjacent pel areas, resulting in the deposit of more than one dye color in said pel areas. This process may also require excessively high voltages not attainable with thin film transistors.

These and other prior-known methods have one or more of the aforementioned disadvantages including high cost, requirement for high voltage, difficulty of processing and maintaining quality control and tendency towards contamination of the individual pel areas with more than one color.

Therefore there is need for a commercially-useful method for producing pel mosaics of different colors for use in LCD devices, which method does not present the aforementioned disadvantages.

SUMMARY OF THE INVENTION

The present invention is based upon the discovery of a new method for producing pel or pixel mosaics of different colors directly upon either the pixel areas of the upper common electrode substrate or upon the pel areas of the lower pel electrode substrate of a liquid crystal display device having a liquid crystal layer between said electrodes, comprising the steps of (a) providing on one of said electrode substrates a plurality of isolated latent picture element filter areas comprising closely-spaced individual pels or closely-spaced individual strips or stripes of pixels, which are individually electrically chargeable, such as by means of connected thin film transistors or connected access leads; (b) applying to selected ones of said latent filter areas, desired to be coated with color compositions of a first color, a charge of a first polarity; (c) applying to all other latent filter areas a charge of the opposite polarity; (d) producing a fine mist of color composition droplets of said first color adjacent the surface of said latent filter areas to be coated; (e) applying to said droplets a charge of said opposite polarity, to cause said droplets to be selectively attracted to and deposited over only the oppositely-charged pel or pixel areas and to be repelled from other areas of the latent color filter layer, and (f) repeating said steps (b) to (e) by selectively charging only selected other pel or pixel latent color filter areas and producing oppositely-charged droplets of other colors for selective attraction and individual deposit upon said other pel or pixel areas, to produce color filter mosaics of different colors, most preferably mosaics comprising a plurality of adjacent triads of red, blue and green colors.

Broadly, the present method is applicable to the sequential selective coating of isolated color filter areas of any transparent electrode support capable of having induced thereon selected area charges of opposite polarities, using coating droplets having a polarity opposite to that of the selected areas to be coated, whereby droplets of different colors are sequentially attracted rather than directed or aimed at said different selected areas According to preferred embodiments of the present invention, the coating method is carried out in an enclosed sealed coating chamber, under slightly reduced atmospheric pressure to retain the mist; the color composition droplets or mist comprises a dye solution and is formed ultrasonically; the droplets are charged to a positive polarity at the source thereof or by passing them into proximity with a corona member; the isolated color filter areas are individual electrode pel members to be color-coated and are charged to a negative potential by actuating transistors associated therewith; the transparent isolated electrode layer applications comprise a heated matrix of latent color filter pel areas pre-coated with a very thin polymer layer to provide a dye-receptive color filter layer over each pel member; the deposited dye layers are diffusible and are heat integrated into the polymer layer portions upon which they are deposited, or the final dye-coated matrix may be supercoated with a protective layer.

DETAILED DESCRIPTION

Figure 1:
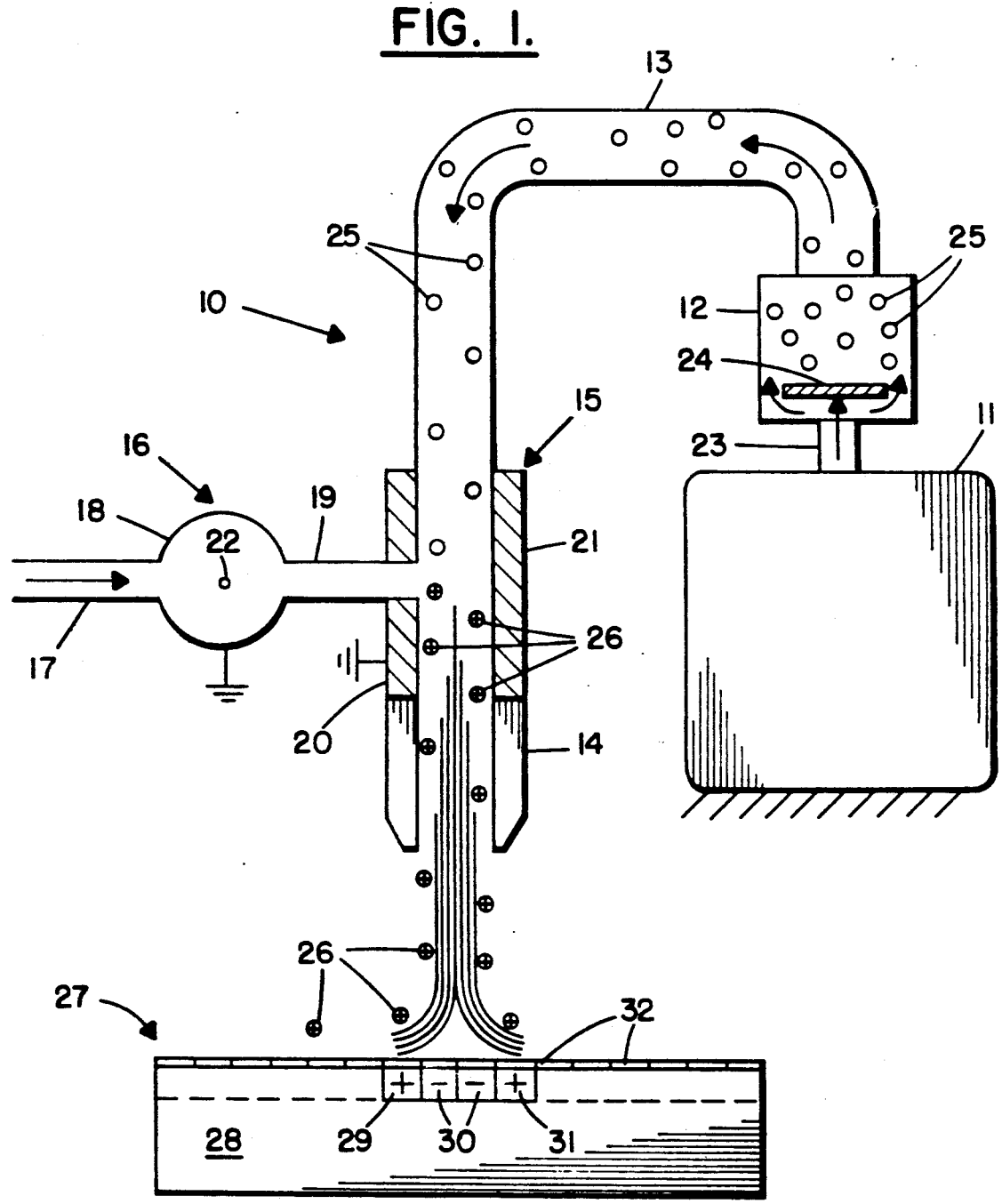
FIG. 1 illustrates a suitable apparatus for carrying out the present selective color-filter coating process according to one embodiment of the present invention.

FIG. 1 of the accompanying drawings illustrates an embodiment of the present invention in which the isolated color filter layer applications are deposited directly in registration upon the surface of the lower or pel electrode member which carries the individual pel areas (without any intermediate color-receptive polymer layer), and more particular, directly upon the pel areas themselves under the influence of charges which are generated by activating the pel areas to different polarities whereby perfect registration is automatically produced. This avoids the problem of attempting to maintain perfect registration while applying color filter areas which are spaced from the pel areas, as is a requirement when the isolated color filter layer applications are formed on the upper or common pixel electrode member, i.e., the electrode member spaced from the electrode layer having the pel areas thereon to enclose the liquid crystal layer therebetween. However, the present methods include the latter embodiment since the present invention enables the accurate placement of closely-spaced isolated color filter areas on any transparent electrode surface capable of having said color filter areas charged to opposite relative polarities.

Referring to FIG. 1, the apparatus 10 illustrated thereby is an A.C. field charging apparatus with which a charge having a greater order of magnitude can be placed upon fine droplets of a liquid than is possible with direct current methods. Air ions are charged to the polarity to be imparted to the liquid droplets, and means are provided to introduce the charged ions into the uncharged droplet stream in the presence of a high voltage alternating electric field.

The apparatus 10 includes an ultrasonic mist generator 11, a mist conduit 13 terminating in a discharge nozzle 14, a droplet charging zone 15 of the conduit 13, upstream of the nozzle 14 and a charged air supply unit 16 which opens into said ion charging zone.

The charged air supply unit 16 comprises an upstream forced air supply conduit section 17, an intermediate DC charging or air ionizing zone 18, and an ionized air supply conduit section 19 opening into the droplet charging zone 15 of the mist conduit 13. The droplet charging zone 15 comprises oppositely-charged electrode plates 20 and 21, plate 20 being grounded and plate 21 being charged, such as to about 1000 volts AC, the alternating voltage frequency being, for example, about 5000 Hz.

The DC air ionizing zone 18 comprises a corona discharge element such as a corona wire 22 such as a 0.05 mm diameter tungsten wire, 5.0 cm long, having about 4,500 VDC applied thereto to produce a corona current of 120 ua.

In operation, the ultrasonic mist generator 11, such as Pollenex Model SH-32, is supplied with a solution of the dye to be applied and, operating at a frequency of about 1.7 MHz, reduces the dye solution to a mist of dye droplets having an average size of about 3 microns.

The droplets are forced through a jet nozzle 23 against a baffle plate 24 within the drop size separator 12 to cause larger droplets to deposit by hydrodynamic impingement on the plate 24 while the desired smaller droplets 25 are carried around the plate 24 and enter the mist conduit 13. The uncharged droplets 25 are forced into the droplet charging zone where they mix with and become charged by the ionized air introduced thereto from the charged air supply unit 16.

The air supply unit receives a supply of forced air through conduit section 17 into the grounded ionizing zone 18 where contact with the high electric field surrounding the corona wire 22 imparts a positive charge to ionize the air. The ionized air molecules enter the mist of uncharged droplets 25 in the droplet charging zone 15 through conduit section 19. The alternating current field between the charging plates 20 and 21, spaced by about 1.5 mm and about 5.0 cm long, and rapidly moves or vibrates the positive air ions into contact with the droplets 25 to produce positively-charged droplets 26 which exit the nozzle 14 close to, and in a direction perpendicular to, the surface areas of the substrate to be coated. The nozzle opening has an exit gap of about 1/16 inch and is about 5.0 cm wide, slightly wider than the substrate 28. A second stage fine filter, using direct current electrostatic precipitation plates (not shown) may be used in the areas of the nozzle 14 to produce a monodisperse drop size.

Due to the dynamics of the impinging jet, those droplets located near the centerline of the jet spray come very close to the substrate and are either strongly attracted or strongly repelled by the respective charged pel areas. Droplets outside the centerline of the jet spray do not come sufficiently close to the substrate to experience any significant attraction or repulsion force and they are swept away by the air stream, preferably for recycling.

FIG. 1 illustrates a latent color filter pel electrode 27 comprising a glass substrate 28 supporting a plurality of discrete isolated pel electrode areas 29, 30 and 31, each having a small area thereof associated with a thin film transistor. Each pel is coated with a thin isolated discrete layer application 32 of a composition capable of accepting and retaining positive or negative charges, such as an ITO or indium tin oxide layer. The ITO layer preferably is spin-overcoated or vapor overcoated with a very thin polymer layer, such as of polyvinyl acetate polyester, to provide a receptive surface for the dye and a surface into which the dye can penetrate or diffuse during post-heating of the dye coating, particularly in cases where the dye is a diffusible dye.

Reference is made to an article by Loufty et al. titled "Fabrication of Color Filter Arrays for Solid-State Imagers by Laser-Induced Dye Diffusion Into Polymers", published in the Journal of Imaging Science, Volume 25, No. 5 (1985), pages 161-164. Said article discloses polyester resins and sublimable dyes which are suitable for use in the present invention.

A significant advantage of the embodiment of FIG. 1, in which a color filter pel electrode is produced arises from the fact that the pel areas which are being colored to form color filter areas of the desired different colors, such as red for pel areas 29, blue for pel areas 30 and green for pel areas 31, are capable of being activated to either positive or negative charges by imparting the desired charges to the thin film transistors associated with said pel areas. Such charges are imparted to the isolated overlying ITO coating areas 32 of each pel and are exerted through the thin polymer supercoating, if present.

In the embodiment of FIG. 1, for example, the dye droplets 26 are of blue dye solution and are intended to be precisely deposited over pel areas 30. Blue dye is to be excluded from pel areas 29 and 31. Therefore the thin film transistors associated with pel areas 30, representing a large plurality within the pel area mosaic, are actuated to a negative charge, opposite to the positive charge of the blue dye droplets 26, while the other pel areas 29 and 31, also representing a large plurality within the pel area mosaic, are actuated through their associated transistors to a positive charge, the same as the charge of the droplets 26. This causes the dye droplets 26 to be selectively drawn to the pel areas 30, more precisely to the surface of the ITO layer present thereon or to the surface of the thin resinous supercoat, if present, on the ITO layer over the pel areas 30. The dye droplets 26 are repelled from the pel areas 29 and 31 since such areas have the same polarity as the droplets 26. The electrode 27 preferably is heated to dry the dye droplets rapidly and prevent droplet agglomeration.

Exposure of the color filter pel electrode 27 is continued for a time period sufficient to deposit uniform thin isolated dye layer areas of the desired color density. The charged droplets 26 that exit near the center line of the nozzle come very close to the surface being treated and this results in a very high electrostatic surface attraction force producing uniform coating of all isolated surface areas overlying the pels 30 being coated. For uniform coating of all desired pel areas 30 across the matrix, using a matrix-wide small width nozzle, it is necessary to scan the entire matrix surface by moving either the nozzle 14 or the pel electrode 27 to assure that all areas being dyed are exposed to the direct perpendicular bombardment of the charged dye droplets which are forced out of the nozzle under the effects of the pressure of the air flow. The distance between the nozzle opening and the surface of the substrate is about 0.7 cm. The exit velocity of the charged droplets will be varied depending upon the size of the droplets but preferably is below a velocity at which the droplets will adhere even to an uncharged plate, i.e. about 70 cm/sec. By increasing the nozzle velocity for a given droplet size the droplets will reach a velocity at which they begin to adhere to an uncharged plate or to the uncharged border areas between isolated pel areas, representing an excessive velocity. Slightly reduced velocities prevent such adhesion to an uncharged plate, so that when the plate or pel electrode is selectively charged the dye droplets are drawn to and uniformly adhered on desired pel areas and selectively repelled from the other pel areas and not deposited in the uncharged border areas between pels. This balance between droplet velocity and selectively-charged surface areas of different polarities prevents any splattering or deposit in background or border areas and provides some latitude in droplet size variation and nozzle velocity, making the process practical to implement.

The aforementioned procedure is sequentially repeated with each of the different dye solutions being deposited at different pel areas to form the color filter mosaic. Thus, to coat the pel areas 29 red, the transistors in said areas are charged negatively and all others are charged positively and red dye droplets are used, and to coat the pel areas 31 green the transistors in said areas are charged negatively and all others are charged positively and green dye droplets are used.

Good deposition of the droplets occurs at a voltage of +10 V and −10 V on the thin film transistors in the respective pel areas. Higher voltages are not necessary but voltages above about 30 should be avoided since such voltages can damage the thin film transistors. These voltages are relative to the ground illustrated which surrounds the corona wire 22 and the field charging plate 20, as shown in FIG. 1.

The direct application of the color filter mosaic layer to the lower electrode plate of the LCD device is a preferred embodiment, as illustrated by FIG. 1, since the lower plate comprises the thin film transistors directly associated with the pel areas. The thin film transistors are connected to only small portions of the pel areas so as not to reduce the light translucency thereof, and provide a simple and convenient means for producing the desired alternate positive and negative charges in the selected pel areas, and therefore the dye deposits forming the color filter mosaic are automatically perfectly aligned over the pel areas.

However it is also possible to apply the novel process of the present invention to the formation of a color filter mosaic on corresponding isolated pixel areas of the transparent upper or common electrode of a LCD device which is spaced above the pel areas of the lower picture electrode, the liquid crystal layer being contained therebetween. In such cases, however, it is necessary to provide a means for pre-forming individually chargeable isolated dye-receiving color filter strip or stripe pixel areas on the surface of the common electrode, each in perfect alignment or registration with strips or stripes of particular pel areas of the picture electrode or pel spaced therebelow. According to an embodiment of the present invention, illustrated by FIGS. 2 to 4, a transparent common electrode plate 35 is provided having a glass substrate 36, a plurality of pairs of spaced electroresistive pixel border lines 37 and 38 which extend to a side edge of the glass substrate and separate and insulate the transparent diagonal electrode layer stripes of electroconductive material 39, such as of indium tin oxide, which fills the diagonal spaces between the border lines 37 and 38 and extends to the edges of the electrode plate so as to be addressable thereat with positive or negative charges, and a dye-receptive micro-thin polymer layer 40, such as of polyvinyl acetate polyester, over said diagonal electrode stripes 39 and diagonal border lines 37 and 38.

The zig-zag lines 37 and 38 are spaced from each other to form insulated ITO-filled color filter diagonal strip areas 41, 42 and 43 which are to have different colors such as red, blue and green and which have a repeating sequence widthwise to provide diagonal areas or stripes of the same color.

The border lines 37 and 38 are printed on the surface of the glass substrate in perfect registration over the corresponding diagonal groups of pel areas of the lower picture electrode so as form diagonal latent pixel color filter areas which will impart a desired single color to light transmitted by the liquid crystal layer in each pel-pixel area between which a voltage differential is established.

Figure 2:
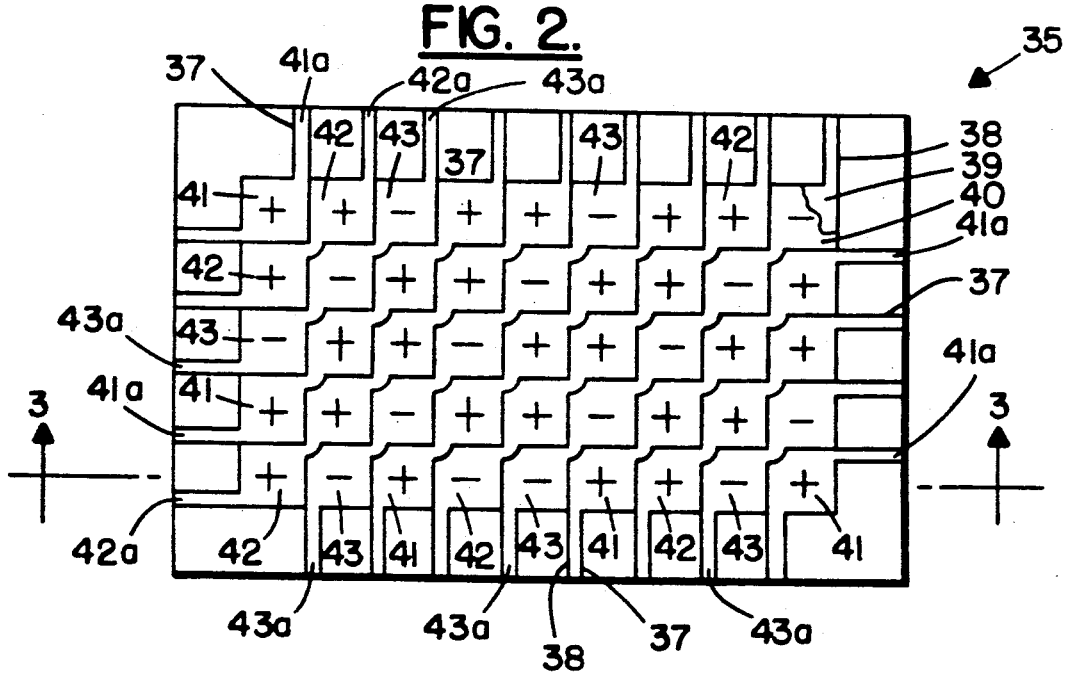
FIG. 2 is a plan view, to an enlarged scale, of the surface of a conductive transparent common electrode plate, illustrating a plurality of adjacent, polymer-coated pixel areas separated from each other by resistive borders, diagonal strips of said pixel areas being interconnected by thin lines of conductive material, such as indium tin oxide, which extend diagonally beyond the pixel areas toward the edges of the transparent plate, diagonal strips or groups of selected ones of said pel areas to be dyed being provided with charges of one polarity while all other pel areas are provided with charges of the opposite polarity.

The latent diagonal color filter pixel areas 41, 42 or 43 to be dyed, such as areas 43 of FIG. 2, are given a negative charge by applying a negative voltage to ITO layer leads 43a at the edge of the plate between the diagonal border lines 37 and 38 which enclose and form the diagonal areas 43 to impart a negative charge to the indium tin oxide layer within said diagonal areas 43. The other diagonal areas 41 and 42 are given a positive charge through the other diagonal ITO leads 41a and 42a between the border lines 37 and 38 which are spaced to enclose and form said other diagonal pixel areas 41 and 42. Preferably the similarly-numbered ITO leads on each edge of the plate, i.e., all 41a leads, all 42a leads and all 43a leads, are interconnected at the edge of the plate so that all similarly-numbered leads can be charged simultaneously and identically at a single contact location.

The charged common electrode 35 is dyed, in the same manner as discussed hereinbefore, by substituting the common electrode 35 for the lower pel electrode 27 of FIG. 1 and repeating the operation using, for example, diffusible sublimable blue dye composition droplets which are positively charged for attraction to negatively-charged diagonal areas 43.

Figure 3:
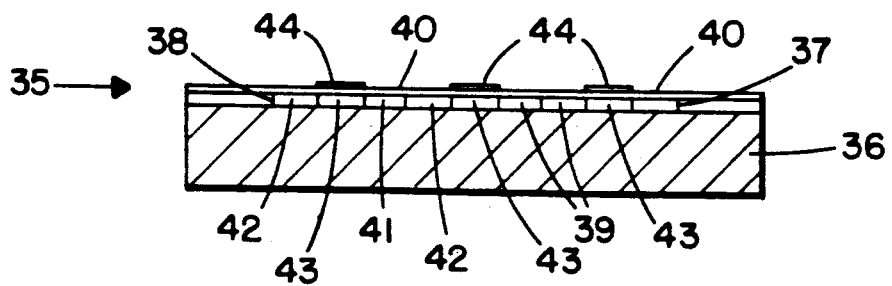
FIG. 3 is a vertical cross-section taken along the lines 3—3 of FIG. 2 illustrating the selective deposition of oppositely-charged diffusible dye composition droplets onto only those pixel areas of FIG. 2 which were negatively charged.
Figure 4:
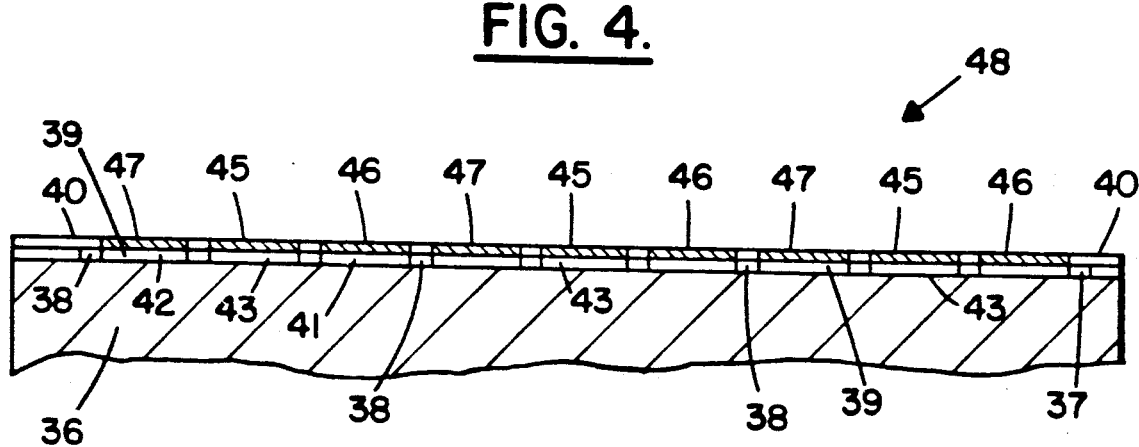
FIG. 4 is a vertical cross-section, to an enlarged scale, of a thin film transistor color filter common electrode for a liquid crystal display device prepared according to FIGS. 2 and 3 illustrating all colors applied and heat-diffused into the polymer layer.

As illustrated by FIG. 3 the blue dye layer 44 deposits selectively over the thin polymer layer 40 over the negatively-charged diagonal pixel areas 43 of the common electrode 35. Heat is simultaneously applied, i.e. about 180° F., to evaporate the solvent and sublime or diffuse the blue dye into the thin polymer layer to form blue filter areas 45 within the polymer layer as shown by FIG. 4. A separate diffusion step can be applied to diffuse the three dye colors after coating, such as by heating in an oven at the required temperature. Thus the filter surface is flat and has no dye build-up or projection above the surface of the polymer layer.

The process is repeated with the other red and green sublimable dyes, selectively charging the diagonal pixel latent filter areas 41 negatively, through the ITO leads 41a at the edges of the plate, for the deposit and diffusion of the red dyes as red filter areas 46, and the selectively charging the diagonal pixel latent filter areas 42 negatively, through the ITO leads 42a, for the deposit and diffusion of the green dye as green filter areas 47 to form the common electrode filter element 48.

The use of diffusible dyes in association with permeable polymer layers is preferred for all embodiments of the present invention since such dyes and polymers produce smooth flat-surface filter layer applications free of dye projections. However non-diffusible dyes can also be used provided that they are deposited as thin surface layer applications having substantially the same thickness so as to present a flat level mosaic surface to maintain proper liquid crystal layer spacing.

When using non-diffusible dyes which build up a thickness over the pixel or pel areas, it is advantageous to coat the border areas separating said pel and pixel areas with a similar thickness of a black dye. This can be done by charging all of the isolated pel or pixel areas to the same potential, such as positive, and applying a mist of black dye droplets charged to the same polarity as the droplets, at a nozzle velocity above the critical velocity at which the black dye droplets will adhere to an uncharged surface. This causes the black dye droplets to be repelled by the charged pel or pixel areas but to be deposited on the uncharged border areas in a predetermined thickness corresponding closely to the colored dye thicknesses in the pel or pixel areas. Aside from providing an overall flat surface on the color filter layer, the presence of black borders between diagonal pixel areas of FIG. 2 or individual pel areas of FIG. 1 provides desirable color separation and improved sharpness.

The preferred dye solutions for use according to the present invention are polyimide dye solutions since polyimide-base dyes provide long term durability and optical characteristics which are desirable in LCD devices. Since such dyes are relatively expensive, it is preferred to enclose the nozzle, and the substrate being coated, within an enclosed deposition chamber and to reclaim the non-deposited dye droplets 26 and the large dye drops accumulated in the particle separator 12, and to recirculate them back into the ultrasonic mist generator 11.

The opacity or density of the dye droplets can be varied depending upon whether the dye layers are being deposited in a single pass, using a nozzle as wide as the total filter matrix, or in multiple scans or passes to produce more than one coat. In either case one or more superposed layers can be deposited to form each color filter area. If the color filter area is applied as a single layer the dye concentration in the droplets should be higher in order to produce the desired color intensity. However it is noted that the dye coating thickness appears to be self-limiting and uniform due to the accumulation of the dye particle charge in the pel or pixel areas, i.e., an increasing charge which eventually repels further dye droplets of the same polarity.

The ultrasonic mist generator 11 preferably is operated at a frequency of about 1.7 MHz to produce droplets having a size of about 3 microns. This provides high resolution coating considering that the size of a typical pel or pixel section area is about 160 microns on a side. However higher frequencies can be used to generate smaller droplets which provide even higher resolution.

The velocity of the dye droplets exiting the nozzle 14 of the apparatus of FIG. 1 normally prevents the dye droplets from depositing on the insulated pel or pixel borders, which are those free of indium tin oxide and therefore unchargeable.

However if black borders are desired surrounding the pel or pixel areas, reverse blow-off polarity can be applied to all pel or pixel areas after the three colored applications. Then black dye droplets are impinged onto the electrically-neutral border areas. Reverse polarity applies the same polarity as the black dye droplets, i.e., a positive charge, to all of the previously colored pel or pixel areas. Since the border areas cannot be externally charged, black dye particles are deposited onto the border areas by high velocity impingement. The pel or pixel areas have already been coated with color dye particles and now will be at the same height or thickness as the black borders.

It will be apparent to those skilled in the art that the present selective area coating process can be used for the selective application of different colored liquid droplets to different closely-spaced isolated areas of the same surface provided that said surface is capable of being charged to opposite polarities in said different closely-spaced areas, and said liquid droplets are charged to one of said polarities. While FIG. 1 illustrates the deposition of positively charged droplets, it will be apparent that the droplets can be negatively charged in known manner for attraction to positively charged pel areas.

Also it should be understood that the color droplets can comprise dispersions of fine color pigment particles in a volatile vehicle, the mist thereof being produced in known manner, such as by atomization under the effects of high velocity air. Such color particles form a surface deposit directly upon the pel or pixel areas and may be supercoated with a thin protective outer layer.

It should also be understood that the alternating diagonal stripes or strips of isolated pixel areas of FIG. 2 may be replaced with alternating horizontal or vertical strips of isolated pixel areas which are easier to print or stripe-coat than are the diagonal areas of FIG. 2.

It is to be understood that the above described embodiments of the invention are illustrative only and that modifications throughout may occur to those skilled in the art. Accordingly, this invention is not to be regarded as limited to the embodiments disclosed herein but is to be limited as defined by the appended claims.

What is claimed is:

1. Process for the production of a color filter electrode member, such as for use in a liquid crystal display device having a translucent upper common electrode and a lower transistor pel electrode having therebetween an opaque liquid crystal layer which is capable of becoming translucent in selective areas thereof upon the establishment of a voltage differential between activated transistor pel areas of said pel electrode and corresponding pixel areas of said common electrode, said process comprising the steps of (a) forming a latent color filter electrode member by applying a plurality of isolated translucent layer applications of electroconductive composition to closely-spaced surface areas of a substrate to produce latent color filter areas thereon; (b) charging selective ones of said applications of electroconductive composition, which are to be colored the same color, to one polarity and charging all other isolated applications of electroconductive composition to the opposite polarity; (c) introducing a mist of charged color droplets of said color into close surface proximity with the charged latent color filter areas of said electrode member, said droplets being charged to a polarity opposite to that of said selective ones of said isolated latent color filter areas to be dyed the same color as said droplets, whereby said droplets are selectively attracted to and deposited upon said selective ones of said latent color filter areas and are repelled by all oppositely-charged areas; and (d) repeating said steps (b) and (c) by charging the applications of electroconductive composition in other isolated latent color filter areas, in a second plurality of closely-spaced isolated charged latent color filter areas which are to be colored a second color, to said one polarity and all other areas to said opposite polarity, and introducing a mist of color solution droplets of said second color charged to said opposite polarity for selective attraction and deposit upon said second plurality of latent color filter areas.

2. Process according to claim 1, in which said isolated layer applications of electroconductive composition comprise indium tin oxide.

3. Process according to claim 1 in which said latent color filter electrode member is a pel electrode member having transistors associated with said pel areas, and said closely-spaced charged latent color filter areas are formed by actuating the transistors in areas to be colored the same color to one polarity while actuating the transistors in all other areas to the opposite polarity.

4. Process according to claim 1 in which said latent color filter electrode member is a common electrode member and the isolated layer applications of electroconductive composition thereon are in the form of stripes or strips comprising closely-spaced isolated latent color filter areas, each area of which is accessible to be charged to said one or said opposite polarity.

5. Process according to claim 1 in which said color droplets comprise dye solution and said electrode member is heated during step (c) to dry said dye solution droplets thereon 6. Process according to claim 1 in which said isolated layer applications of electroconductive composition are supercoated with a thin translucent polymer layer, said color droplets comprise a heat-diffusible dye and said color filter electrode member is heated to cause said dye to penetrate said polymer layer in the color filter areas.

7. Process according to claim 1 which comprises using an ultrasonic mist generator to form said color droplets from a dye and a volatile solvent therefor.

8. Process according to claim 1 in which said color droplets are charged by agitating air ions to bombard said droplets.

9. Process according to claim 8 in which said ions are agitated by passing them through a zone of alternating field.

10. Process according to claim 1 in which said droplets have an average size of about 3 microns.

11. Process according to claim 1 which comprises introducing said mist in step (c) in the form of a stream of color droplets directed perpendicularly towards the surface of the charged latent color filter areas of the electrode member being colored.

12. Process according to claim 11 in which said stream has a velocity slightly less than the velocity at which said droplets will deposit upon an uncharged surface.

13. A method of depositing a liquid dye on the surfaces of selected TFT electrodes present in a matrix of TFT electrodes, comprising the steps of:
forming said dye into droplets;
electrostatically charging said dye droplets to a first potential having a first sign;
biasing selected ones of said TFT electrodes in said matrix to a first potential having said first sign and biasing selected others of said TFT electrodes in said matrix to a second potential having a second sign, said second sign being opposite said first sign; and
placing said charged dye droplets in proximity to said matrix of electrodes whereby said droplets are selectively attracted to and deposit on said electrodes biased to said second potential.

14. A method of depositing a liquid dye on the surfaces of a selected TFT electrodes present in a matrix of TFT electrodes, comprising the steps of:
forming said dye into droplets;
electrostatically charging said dye droplets to a first potential having a first sign;
biasing selected ones of said TFT electrodes to a second potential having a second sign, said second sign being opposite said first sign; and directing a stream of said charged dye droplets perpendicularly towards the surface of said matrix of TFT electrodes, at a velocity slightly less than the velocity at which said droplets will deposit upon an uncharged surface, whereby said droplets are attracted by and selectively deposited on said biased electrodes.

15. A method according to claim 14 in which the velocity of said dye droplets is below about 70 cm/sec.

16. A method according to claim 14 in which said dye droplets have an average size of about 3 microns or less.

* * * * *